UNITED STATES PATENT OFFICE.

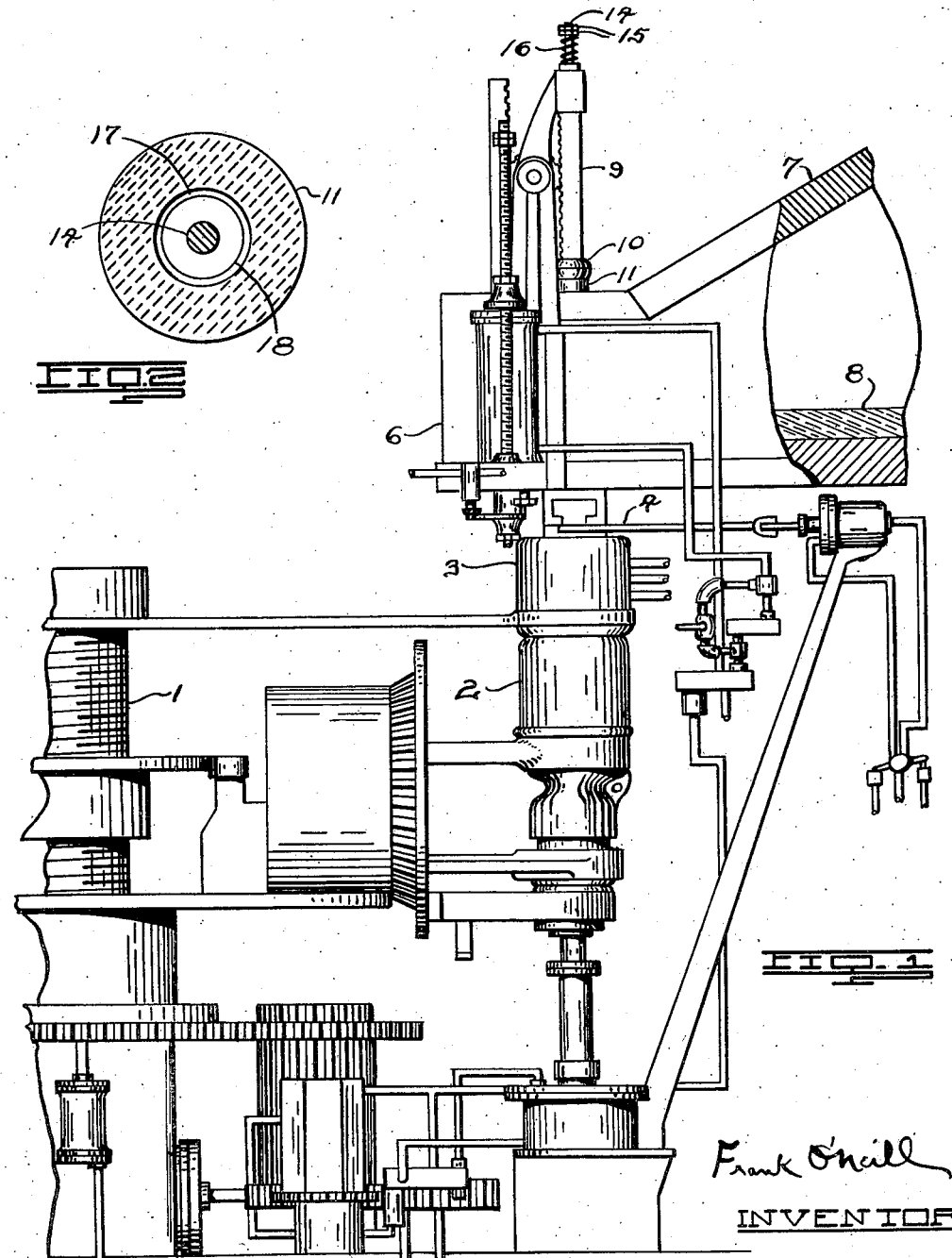

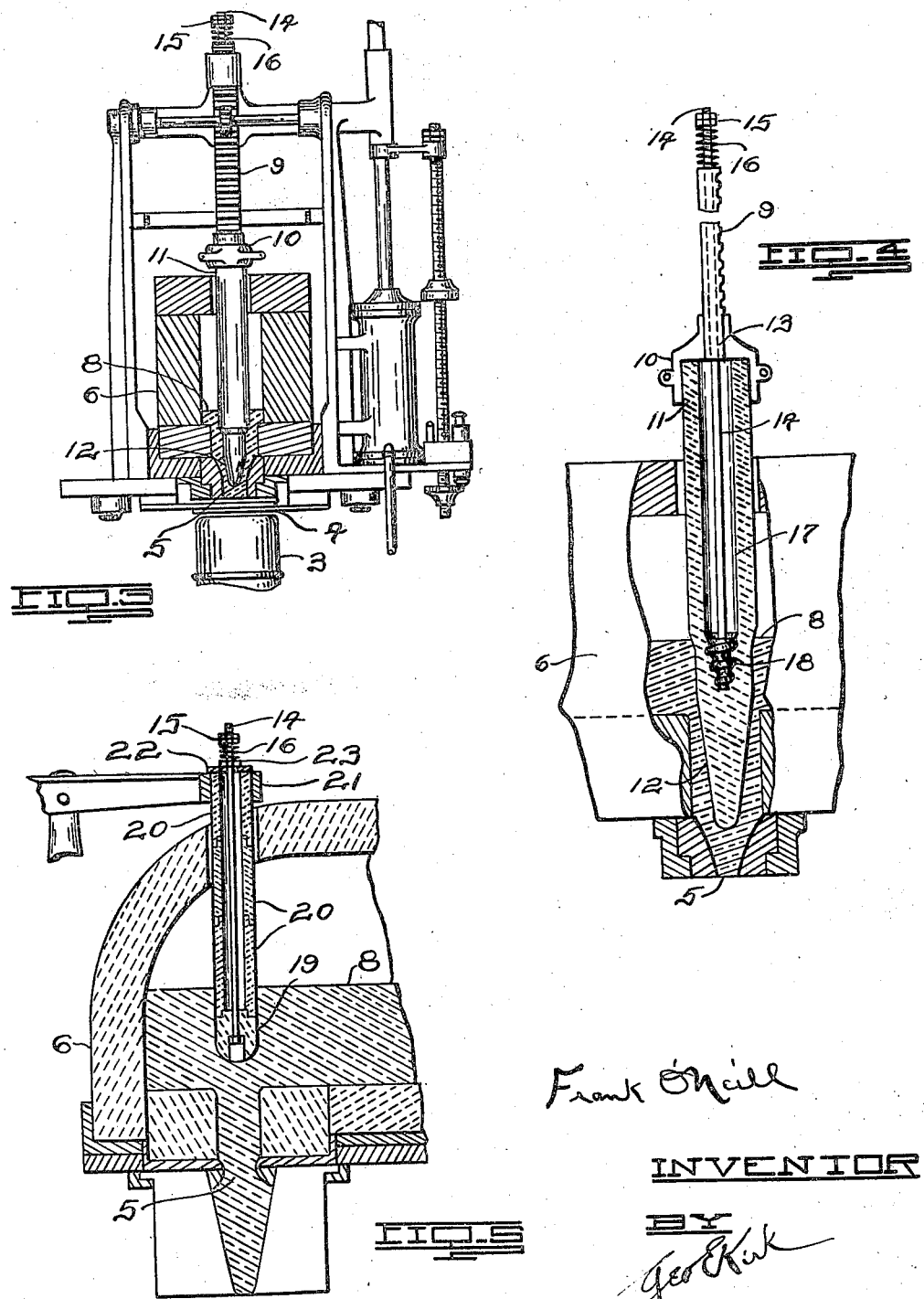

FRANK O'NEILL, OF TOLEDO, OHIO.

GLASS-FLOW-OFF CONTROLLER.

1,413,183.  Specification of Letters Patent.  Patented Apr. 18, 1922.

Application filed October 17, 1921. Serial No. 508,321½.

*To all whom it may concern:*

Be it known that I, FRANK O'NEILL, a citizen of the United States of America, residing at Toledo, Lucas County, Ohio, have invented new and useful Glass-Flow-Off Controllers, of which the following is a specification.

This invention relates to glass tank mechanism.

This invention has utility when incorporated in control needle, plunger, and piston devices especially as adapted to cooperate from a glass tank region, to coact with an orifice or outlet.

Referring to the drawings:

Fig. 1 is a fragmentary side elevation of a glass bottle forming machine adjacent a tank with a device of this disclosure in association at the tank;

Fig. 2 is a cross section through the refractory plunger or needle of the device of this disclosure;

Fig. 3 is a section of the overhang from the tank showing the needle or plunger in cooperative relation;

Fig. 4 is a fragmentary enlarged view of the plunger or refractory device of this disclosure, parts being broken away; and Fig. 5 is a showing of a modified form of such a plunger.

A fragment only is shown of a two column glass bottle blowing machine, column 1 being the column for handling the blank molds. Blank mold 2 is shown as brought under a fixed guide 3 just below a shear 4 disposed adjacent outlet 5 at overhang 6 from tank 7 having pool 8 of molten glass therein. Driving mechanism is shown as effective for reciprocating rack 9 of a mounting having clamp 10 engaging the upper end 11 of a refractory having a lower head end 12.

This rack or mounting 9 is shown as having passage 13 as a guide for rod 14 extending upwardly therethrough and having nuts 15 thereon adjustable for taking care of compression of helical spring 16 upon this rod 14 between the nuts 15 and the upper end of the mounting 9. This rod 14 extends downward through tubular portion or air chamber 17 of the refractory 11 to have head 18 engaged by threaded connection with the interior portion of the head 12. There is accordingly provided a support for this head 12 not only carrying the load of the entire refractory against concussion but through this rod 14 and the expansion take-up spring 16 effective to avoid any loosening up of this refractory 11, 12, between its mounting and support 14.

The more intense heat region is just above the pool 8 of the glass in this overhang of the furnace, and this being the region of the refractory which would be under strain as to the action of the head in the molten glass there is a weakness at this portion and by the provision of this metallic support 14 insulated by air chamber 17, there is a mechanical removal of strain in the handling of the head 12 as to this greater attack undergoing tubular portion 11 of the refractory just above the pool of glass 8.

The strength of the spring 16 is sufficient in its compression to carry the load of this head 12. In practice, when the length of the refractory from the mounting 9 to the terminus of the head 12 runs about 20 inches there may be an expansion of as much as one-half inch in the rod 14 greater than the refractory. The spring 16 is effective in taking care of this expansion and has a sustaining action in its expansion take-up in maintaining the load of this refractory as largely carried directly from the head 12 by threaded engaging portion 18 in all operations of this head 12.

The location of this head 12 in the pool, and the accurate shifting thereof without crumbling off into the gathers or feedings is essential for controlling the flow of glass either by expulsion or by cutting off or other movements or degrees of clearance as to the outlet 5. The expansion take-up contributes rigidity to the refractory and eliminates lost motion.

The clamp 10 is a rigid mounting for the upper portion of this refractory, and accordingly the refractory is held in two places. The refractory in itself has a tendency to a slight expansion notwithstanding its earthen nature, but this is less than that of the metallic mounting or support 14. By actually holding this refractory at two points, it is practicable to maintain the refractory in a condition for use even should it be fractured in an intermediate portion.

In some instances it may be desirable to build up the refractory, this having advantages in that the portion of the refractory first giving way by use may be displaced by new sections. To this end there is shown in Fig. 5 a refractory having a head 19 with which interfits tubular section 20 which as extended may have the upper member thereof engaged by a mounting 21. The upper tubular section 20 above the mounting 21 is closed by a cap 22 through which protrudes a bolt 23, the head of which bolt engages in the head 19 of the refractory. The portion of the bolt protruding above this cap 22 is embraced by helical compression spring 16 which is adjusted by nuts 15. This bolt 23 is accordingly an expansion take-up for the refractory. The main load of the refractory is carried by the head 19, and from the head 19 by this bolt 23. The spring 16 takes up the difference in expansion between the sectional refractory 19, 20, and the metal bolt 23, this metal bolt having a much greater coefficient of expansion than the earthen refractory material of the tubular section 20.

What is claimed and it is desired to secure by Letters Patent is:

1. The combination with a container for a pool of molten glass, said pool having an outlet for the glass below the pool surface, of controlling means for said outlet comprising a support exterior of the container, a refractory plunger, an upper refractory portion of which plunger extends out of the container and is there sustained by the support independently of the portion therebelow, additional means engaging the support and connected to the lower portion of the plunger for holding said lower portion upward toward the support held portion, said refractory concealing the support and the additional means from communicating with the pool, and controlling means normally maintaining the support in plunger sustaining position.

2. The combination with a container for a pool of molten glass, said container having an outlet for the glass below the surface of the pool, of controlling means for said outlet comprising a shiftable support, a refractory plunger, an upper refractory portion of which plunger is fixed with the support to be sustained thereby independently of the portion therebelow, additional means engaging the support and embodying a spring for yieldably sustaining the lower portion of the plunger for holding said lower portion upward toward the support held portion, said refractory concealing the support and the additional means from communicating with the pool, and controlling means normally maintaining the support in plunger sustaining position.

3. The combination with a container for a pool of molten glass, said container having an outlet for the glass below the surface of the pool, of controlling means for said outlet comprising a support, a refractory plunger embodying an upper portion sustained directly by the support independently of the portion therebelow and said upper portion having a central passage therethrough to a lower portion having a threaded seat, a stem through the passage and having threaded engagement with said seat, a spring about the stem, said spring being sustained by the support for yieldably maintaining the plunger portions assembled therewith, and means for shifting the support to vary the submergence of the plunger, said refractory concealing the support and the additional means from communicating with the pool, and controlling means normally maintaining the support in plunger sustaining position.

4. The combination with a container for a pool of molten glass, said container having an outlet for the glass below the surface of the pool, of controlling means for said outlet comprising a support, a refractory plunger projecting downward into the pool and having an intermediate heat weakened portion, said plunger embodying an upper portion sustained directly by the support independently of the plunger portion therebelow, said upper portion having a central passage therethrough to a lower portion thereof, a reinforcing stem for the refractory coacting with the lower portion and extending upward through the passage, a heat expansion take-up spring about the stem, said spring being sustained by the support for yieldably maintaining the plunger refractory portions assembled therewith, said upper held refractory portion relieving the heat weakened intermediate portion from crushing strain and the stem carried lower portion relieving the heat weakened intermediate portion from tension strain thereby distributing the load of the plunger, and means for shifting the support to vary the submergence of the plunger in the pool and normally maintaining the support in plunger sustaining position.

5. The combination with a container for a pool of molten glass, said container having an outlet for the glass below the surface of the pool, of controlling means for said outlet comprising a support, a refractory plunger projecting downward into the pool and having an intermediate heat weakened portion, said plunger embodying an upper portion sustained by the support independently of the portions therebelow, said upper portion having a central passage therethrough to a lower portion having a threaded seat, a reinforcing stem for the refractory having threaded engagement with said seat, a heat expansion take-up spring about the stem, said spring being sustained by the support for yieldably maintaining the plunger refractory portions assembled therewith, said upper held refractory portion relieving the heat weakened intermediate portion from crushing strain and the stem carried lower portion relieving the heat weakened intermediate portion from tension strain thereby distributing the load of the plunger, and means for shifting the support to vary the submergence of the plunger in the pool and normally maintaining the support in plunger sustaining position.

In witness whereof I affix my signature.

FRANK O'NEILL.